(12) United States Patent
Connolly et al.

(10) Patent No.: US 10,815,951 B2
(45) Date of Patent: *Oct. 27, 2020

(54) COORDINATED ACTUATION TO START AN ENGINE

(71) Applicant: Ford Global Technologies, LLC, Dearborn, MI (US)

(72) Inventors: Francis Thomas Connolly, Ann Arbor, MI (US); Scott James Thompson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/818,863

(22) Filed: Nov. 21, 2017

(65) Prior Publication Data

US 2019/0153987 A1    May 23, 2019

Related U.S. Application Data

(63) Continuation of application No. 15/358,488, filed on Nov. 22, 2016, now Pat. No. 9,828,924.

(51) Int. Cl.

| F02N 11/00 | (2006.01) |
| F02N 11/04 | (2006.01) |
| F02N 15/02 | (2006.01) |
| B60W 20/15 | (2016.01) |
| F02N 11/08 | (2006.01) |

(52) U.S. Cl.
CPC ........... *F02N 11/006* (2013.01); *B60W 20/15* (2016.01); *F02N 11/04* (2013.01); *F02N 11/0851* (2013.01); *F02N 15/022* (2013.01); *B60W 2555/20* (2020.02); *F02N 2200/122* (2013.01)

(58) Field of Classification Search
None
See application file for complete search history.

(56) References Cited

U.S. PATENT DOCUMENTS

| 9,080,542 B2 | 7/2015 | Nefcy et al. |
| 9,086,045 B2 | 7/2015 | Wang et al. |

(Continued)

FOREIGN PATENT DOCUMENTS

| DE | 102010019047 A1 | 11/2011 | |
| DE | 102010060072 A1 | 6/2012 | |
| WO | WO-2012085294 A1 * | 6/2012 | ............. F02N 11/04 |

*Primary Examiner* — Tamara L Weber
(74) *Attorney, Agent, or Firm* — David Kelley; Brooks Kushman, P.C.

(57) ABSTRACT

A vehicle includes an engine and an electric machine coupled to a transmission element. The electric machine is also selectively coupled with the engine by a clutch. The vehicle includes a belt integrated starter-generator (BISG) operatively coupled to the engine. An electronic controller includes one or more inputs adapted to receive a temperature measurement and a request to start the engine. The electronic controller is programmed to energize the BISG and the electric machine in response to receiving an engine start request and a temperature measurement being less than a threshold temperature measurement. The electronic controller is further programmed to close the disconnect clutch to apply torque from the electric machine to the engine in response to the electric machine achieving a threshold electric machine speed.

20 Claims, 2 Drawing Sheets

(56) References Cited

U.S. PATENT DOCUMENTS

| | | |
|---|---|---|
| 9,145,862 B2 | 9/2015 | Nefcy et al. |
| 9,321,457 B2 | 4/2016 | Gibson et al. |
| 9,322,378 B2 | 4/2016 | Lovett et al. |
| 9,358,968 B2 | 6/2016 | Nedorezov et al. |
| 2002/0145430 A1 | 10/2002 | Arai |
| 2009/0098976 A1* | 4/2009 | Usoro .................. B60K 6/24 477/5 |
| 2010/0236851 A1 | 9/2010 | Van Maanen |
| 2012/0006152 A1 | 1/2012 | Fuechtner |
| 2013/0066492 A1 | 3/2013 | Holmes |
| 2013/0160731 A1 | 6/2013 | Poeltenstein |
| 2013/0219876 A1 | 8/2013 | Motodohl |
| 2013/0260955 A1 | 10/2013 | Kimata |
| 2013/0260957 A1 | 10/2013 | Ueda |
| 2014/0124321 A1 | 5/2014 | Frait |
| 2015/0226171 A1 | 8/2015 | Kees et al. |
| 2016/0185335 A1 | 6/2016 | Namuduri et al. |

\* cited by examiner

COORDINATED ACTUATION TO START AN ENGINE

CROSS-REFERENCE TO RELATED APPLICATION

This application is a continuation of U.S. patent application Ser. No. 15/358,488, filed on Nov. 22, 2016, now U.S. Pat. No. 9,828,924, issued on Nov. 28, 2017, the disclosure of which is hereby incorporated in its entirety by reference herein.

TECHNICAL FIELD

This disclosure relates to actuation of powertrain components to start an engine. More particularly, this disclosure relates to coordinated actuation of both an integrated starter and an electric motor to start an engine.

BACKGROUND

A hybrid electric vehicle (HEV) powertrain includes an engine and an electric motor, wherein torque (or power) produced by the engine and/or by the motor can be transferred through a transmission to the vehicle drive wheels to propel the vehicle. A traction battery supplies energy to the motor for the motor to produce the motor torque for propelling the vehicle.

In certain configurations, the engine is connectable to the motor by a disconnect clutch and the motor is connected to the transmission. The engine, the disconnect clutch, the motor, and the transmission are connected sequentially in series.

The electric motor may start the engine by providing torque to crank the engine. In very cold temperatures (e.g., below 20 degrees Celsius), however, the output of an associated high voltage battery is significantly reduced. Thus, the torque produced by the electric motor alone may not be sufficient to crank the engine.

Some HEV's may be provided with a low voltage (e.g., 12V) starter to assist the electric machine in starting the engine. In some approaches, the low voltage starter includes a belt integrated starter (BIS or BISG) that includes a belt drive connecting a crankshaft of the engine to the BIS(G). In very cold temperatures, the BIS(G) may experience belt slip.

SUMMARY

In at least one approach, a vehicle is provided. The vehicle may include an engine and an electric machine coupled to a transmission element. The electric machine may be selectively coupled with the engine by a clutch. The vehicle may include a belt integrated starter-generator (BISG) operatively coupled to the engine. An electronic controller may include one or more inputs adapted to receive a temperature measurement and a request to start the engine. The electronic controller may be programmed to energize the BISG and the electric machine in response to receiving an engine start request and a temperature measurement being less than a threshold temperature measurement. The electronic controller may be further programmed to close the disconnect clutch to apply torque from the electric machine to the engine in response to the electric machine achieving a threshold electric machine speed.

In at least one approach, a method of starting an engine of a vehicle is provided. The method may include, at a controller, in response to receiving an engine start request and a temperature measurement being less than a threshold temperature measurement, energizing an electric machine. The method may further include, in response to the electric machine achieving a threshold electric machine speed, closing a disconnect clutch to apply torque to the engine. The method may further include actuating a belt-driven integrated starter generator (BISG) to apply torque to the engine.

In at least one approach, a method of starting an engine of a vehicle is provided. The method may include, at a controller, in response to receiving an engine start request and a temperature measurement being less than a threshold temperature measurement, energizing both an electric machine and a belt-driven integrated starter generator (BISG). The method may further include, in response to the electric machine achieving a threshold electric machine speed, closing a disconnect clutch to apply a torque from the electric machine to the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
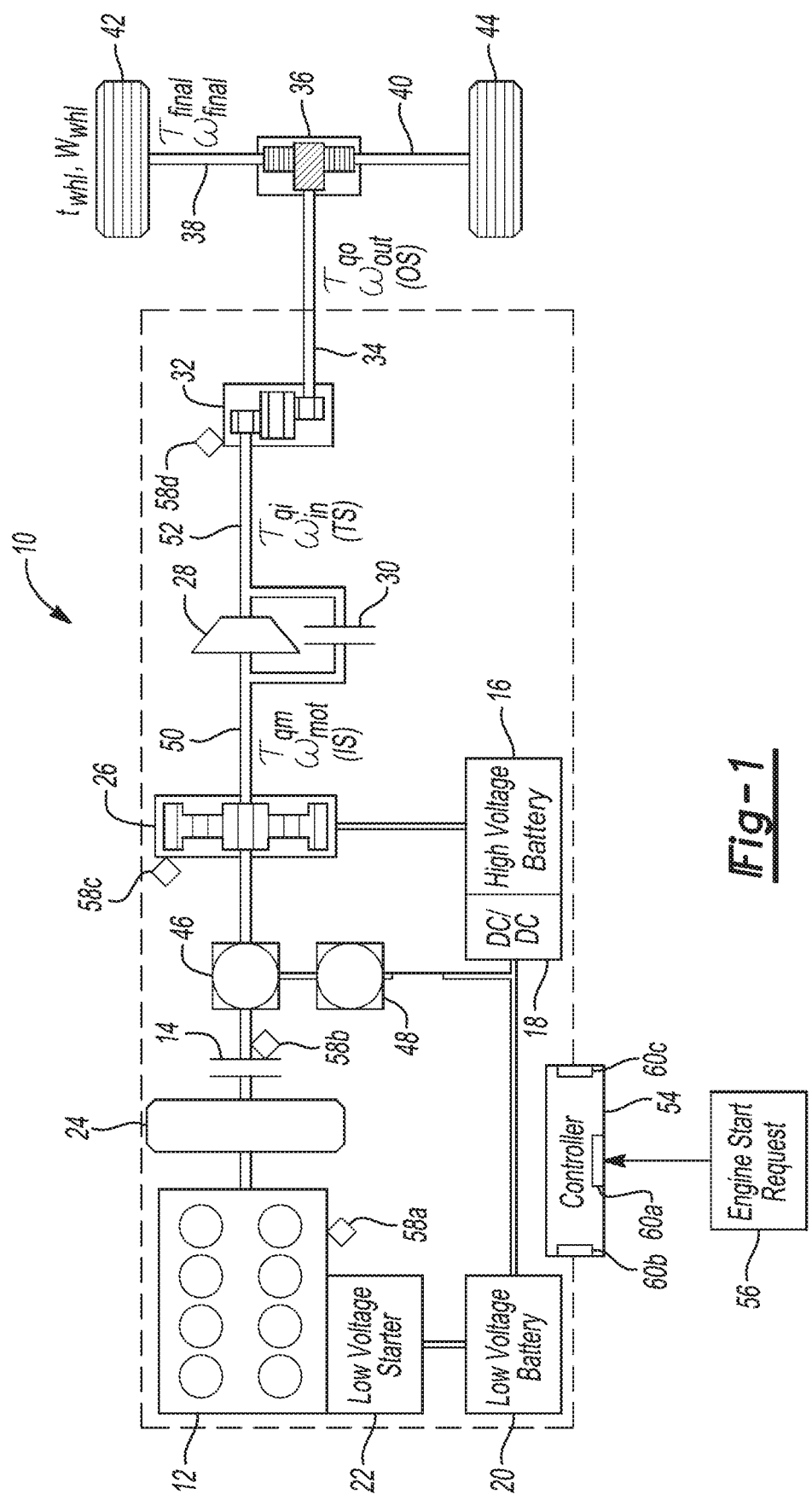
FIG. 1 is a schematic diagram showing an arrangement of components related to the powertrain for a HEV.

Referring to FIG. 1, a schematic diagram of a powertrain 10 of a hybrid electric vehicle (HEV) is illustrated according to an embodiment of the present disclosure. FIG. 1 illustrates representative relationships among the components. Physical placement and orientation of the components within the vehicle may vary. Other configurations are expressly contemplated herein.

The components of the powertrain 10 include an engine 12, an engine disconnect clutch 14, a high voltage battery 16, a high voltage to low voltage DC/DC converter 18, low voltage battery 20, low voltage starter 22, torsion damper 24, electric machine or motor 26, torque converter 28, torque converter bypass clutch 30, transmission gear box 32, driveshaft 34, final drive gearing 36, halfshafts 38, 40, and driven wheels 42, 44. The engine 12 generally represents a power source that may include an internal combustion engine (ICE) such as a gasoline, diesel, or natural gas powered engine, or a fuel cell.

The low voltage starter 22 is operatively connected to the engine 12. In one example, the starter 22 may be battery-operated, wherein the starter 22 is driven by energy from the battery 20. Although described herein as a low voltage starter, the starter may be a high voltage starter connected to a high voltage battery. In either approach, the starter 22 is configured to support engine start or restart. That is, by operating the starter 22, the engine 12 may be spun and cranked. In a preferred approach, the starter 22 is a belt-driven integrated starter generator (BISG). Although a belt-driven approach is described herein, other types of drives could be used to provide a driving connection between the engine 12 and the starter 22. For example, a flexible chain drive or a geared drive could be used. In other approaches, the starter 22 may be a crank integrated starter generator (CISG). In still other approaches, the starter may be a powertrain drive motor, such as a hybrid power-plant connected to the engine by way of a coupling device.

The torsion damper 24 is also operatively connected to the engine 12. The torsion damper 24 comprises a coiled spring or a mechanism that includes multiple coiled springs, wherein torsion applied to the damper causes displacement of the spring mechanism. The torsion damper 24 may therefore serve to modulate or eliminate high frequency torsional vibration from the powertrain 10.

The engine 12 is operatively connected to the electric motor 26 and transmission 32 through the disconnect clutch 14. The disconnect clutch 14, which may be electrically or hydraulically actuated, can engage and disengage the engine 12 from the powertrain to satisfy operational requirements of the hybrid vehicle in different modes. Depending on whether the disconnect clutch 14 is engaged or disengaged determines which input torques are transferred to the transmission 32. For example, if the disconnect clutch 14 is disengaged, only torque from the electric motor 26 is supplied to the transmission 32. If the disconnect clutch 14 is engaged, torque from both the engine 12 and the electric motor 26 is supplied to transmission 32. Of course, if only torque from the engine 12 is desired for the transmission 32, the disconnect clutch 14 is engaged, but the electric motor 26 is not energized such that only torque from the engine 12 is supplied to transmission 32.

A main transmission pump 46, driven by the electric motor 26, supplies pressurized hydraulic fluid to the hydraulic system of the transmission 32 and the torque converter 28. An auxiliary oil pump 48, driven by an electric motor (not shown), supplies pressurized hydraulic fluid to the hydraulic system of the transmission 32 and the torque converter 28 when the engine is off.

The electric motor 26 is powered by the high voltage battery 16 and is secured to an impeller shaft 50 of the torque converter 28. When bypass clutch 30 is open, differential speed between the transmission input shaft 52 and the impeller shaft 50 is possible. When the bypass clutch 30 is closed the torque converter impeller and turbine are mechanically connected, in which case the speed of the electric motor 26 and transmission input 52 are substantially identical.

The transmission 32 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the driveshaft 34 and the transmission input shaft 52. The transmission 32 is automatically shifted from one ratio to another based on various vehicle and ambient operating conditions by an associated controller 54, such as a powertrain control unit (PCU). The transmission 32 then provides powertrain output torque to the driveshaft 34.

It should be understood that the hydraulically controlled transmission 32 used with a torque converter 28 is but one example of a transmission arrangement; any multiple ratio gearbox that accepts input torque(s) from an engine and/or a motor and then provides torque to an output shaft at the different ratios is acceptable for use with embodiments of the present disclosure. For example, other types of automatic transmissions can be used in the powertrain 10, e.g. a continuously variable transmission (CVT) having a drive belt engaged with a two pulleys, or an automatic manual transmission. In another example, the transmission may be an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

While illustrated as one controller, the controller 54 may be part of a larger control system and may be controlled by various other controllers throughout the vehicle, such as a vehicle system controller (VSC). It should therefore be understood that the controller 54 and one or more other controllers can collectively be referred to as a "controller" that controls various actuators in response to signals from various sensors to control functions such as starting/stopping engine 12, operating electric motor 26 to provide wheel torque or charge battery 16, select or schedule transmission shifts, etc. The controller 54 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 54 may be in communication with various components of the powertrain 10 such as, for example, the engine 12, the disconnect clutch 44, the high voltage battery 16, the low voltage battery 20, the low voltage starter 22, and the electric motor 26. The controller 54 may also be in communication with an operator input 56. The operator input 56 may be an ignition switch, push button or the like, configured to provide an engine start request to the controller 54. The controller 54 may also be in communication with one or more sensors, e.g., sensors 58a, 58b, 58c, 58d, located throughout the vehicle. The one or more sensors 58 may monitor and provide information to the controller 54 regarding, for example, an engine rotational speed, a motor rotational speed, starter rotational speed, ambient air temperature, intake air temperature, engine oil or coolant temperature, cylinder head temperature, engine cylinder block temperature, and other characteristics. The controller 54 is in communication with the various components through one or more interfaces 60a, 60b, 60c. The interfaces 60a, 60b, 60c may include inputs (e.g., adapted to receive information or commands), outputs (e.g., adapted to send information or commands), or combined input/outputs. For example, interface 60a may be an input adapted to receive an engine start request 56. Interface 60b may be an input adapted to receive a temperature measurement (e.g., an ambient air temperature measurement) and/or spin speeds of the engine 12 and the electric motor 26. Interface 60c may be an output adapted to send commands to the various components of the powertrain 10. Although FIG. 1 shows three interfaces 60a, 60b, 60c, the controller 54 may be provided with one interface, two interfaces, or four or more interfaces.

Under normal operating conditions, when an engine start request 56 is received at the controller 54, the controller 54 commands various components of the powertrain 10 to start the engine 12. In one approach, the starter 22 is used to crank the engine 12 directly. In another approach, the engine 12 is cranked to start by the electric motor 26. More specifically, the high voltage battery 16 energizes the electric motor 26 to cause the electric motor 26 to spin. When an engine start is imminent and before the engine 12 is cranked, the disconnect clutch 14 is closed, preferably using hydraulic pressure, to produce a torque transmitting capacity of clutch 14 such that the electric motor 26 functions as a starting motor. When the magnitude of torque applied to the crankshaft of engine 12 exceeds the minimum torque for an engine start, the engine 12 begins cranking. Thereafter, fuel is supplied to engine 12, and engine speed is controlled to engine idle speed, thereby completing the engine starting procedure.

Figure 2:
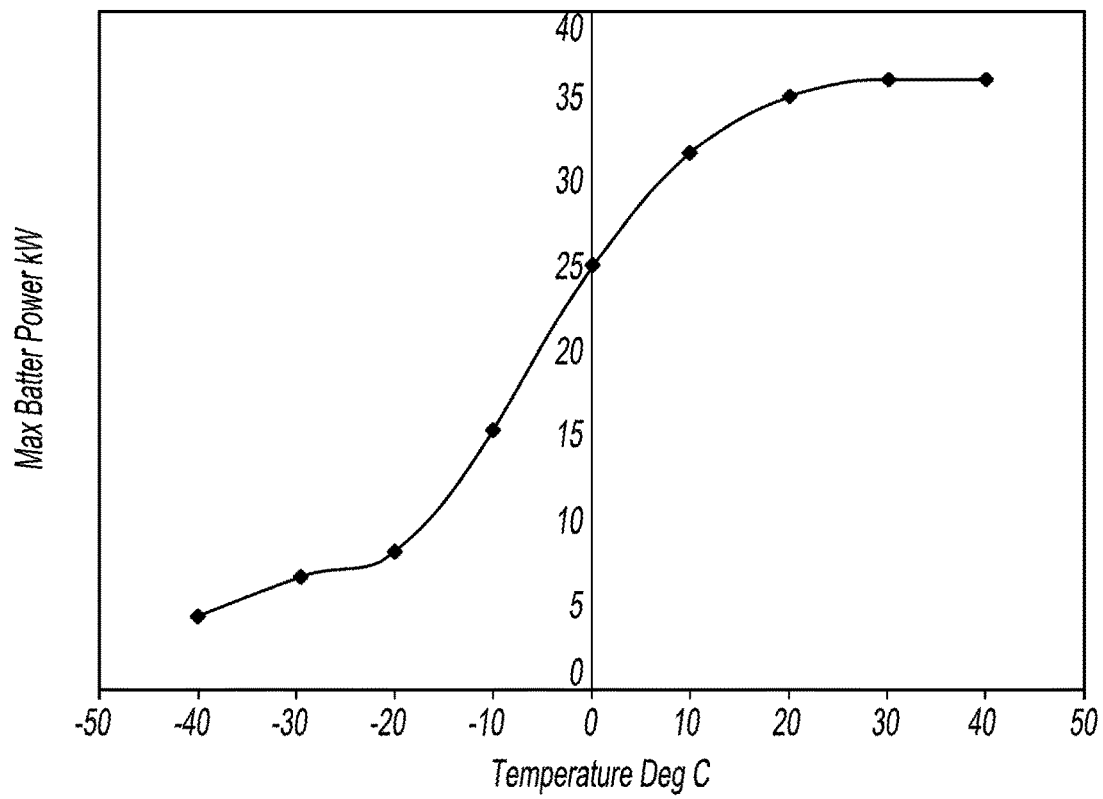
FIG. 2 is plot demonstrating an exemplary effect of ambient temperature on the power that may be provided by a high voltage battery.

Engine starts at very low temperatures may present challenges to the starting process. For example, the torque required to start the engine 12 is dramatically increased at very low temperatures, particularly if ice crystals form within the engine 12. Furthermore, in the approach described wherein the starter 22 is used to crank the engine 12, the starter 22 may experience belt slippage at very low temperatures. In the approach described wherein the electric motor 26 is used to crank the engine 12 through the disconnect clutch 14, the high voltage battery 16 may fail to provide sufficient electric power to the electric motor 26 due to a very low ambient temperature. As shown in FIG. 2, as the ambient temperature decreases, the battery power available to spin the electric motor 26 to start the engine 12 may decrease. For example, at ambient temperatures less than −10 degrees Celsius, the high voltage battery 16 may be unable to provide the minimum amount of power to start the engine 12 using the electric motor 26 alone.

To improve engine start in very low temperature conditions, the controller 54 is adapted to coordinate actuation of both the low voltage starter 22 and the electric motor 26 to start the engine 12. Coordinated actuation of two starter components has been found to provide improved engine start performance in such conditions.

As previously described, the controller 54 is adapted to receive an engine start request 56 at an input (e.g., at interface 60a). The controller 54 is also adapted to receive a temperature measurement at an input (e.g., at interface 60b). The controller 54 then determines whether the temperature measurement is less than a threshold temperature measurement. The temperature measurement may be, for example, an ambient air temperature measurement and may be measured by a sensor (e.g., sensor 58a) in, at, or near the engine 12. In other approaches, temperature measurement is a measurement received at the controller 54 from sensors located throughout the vehicle (e.g., sensors 58b, 58c, 58d).

Where the temperature measurement is an ambient air temperature measurement, the threshold temperature measurement may be, for example, in the range of −30 to +5 degrees Celsius. More specifically, the threshold temperature measurement may be in the range of −20 to −5 degrees Celsius. For example, the threshold temperature measurement may be −10 degrees Celsius.

As used herein, a temperature measurement is "less" than a threshold temperature measurement when the temperature measurement is colder than the threshold temperature measurement. For example, an ambient air temperature measurement of −20 degrees Celsius is less than a threshold temperature measurement of −10 degrees Celsius, whereas an ambient air temperature measurement of +10 degrees Celsius is greater than a threshold temperature measurement of −10 degrees Celsius.

To begin the engine start when the temperature measurement is less than the threshold temperature measurement, the controller 54 is configured to effect actuation of the electric machine 26. For example, the controller 54 may issue a command via an output (e.g., at interface 60c) to start the electric machine or motor 26. The command may be issued to the high voltage battery 16, instructing the high voltage battery 16 to energize the electric motor 26, or may be issued to the electric motor 26, instructing the electric motor 26 to draw power from to the high voltage battery 16. In either approach, the electric motor 26 is energized and begins to spin. For example, electric motor 26 may be spun to an idle speed (e.g., 500 or 600 revolutions per minute).

The controller 54 is further configured to close the disconnect clutch 14, such that the engine 12 is at least partially engaged to the powertrain. In this way, torque produced by the electric motor 26 is applied to the engine 12.

In a preferred approach, the electric motor 26 is spun to an electric motor threshold speed prior to the closing of the disconnect clutch 14. In this way, the controller 54 may be adapted to monitor a speed of the electric motor 26, for example, via sensor 58c associated with the electric motor 26. The electric motor threshold speed may be, for example, 100 revolutions per minute, 300 revolutions per minute, or an idle speed of 500 or 600 revolutions per minute. In other approaches, the disconnect clutch 14 is closed simultaneously or substantially simultaneously with the actuation of the electric motor 26.

The closing of disconnect clutch 14 exploits the spinning inertia of the electric motor 26 to provide torque to the engine 12, thereby causing the engine 12 to begin spinning. At this point, the electric motor speed may drop as the disconnect clutch torque builds, and may even lock to the engine speed.

As discussed, the energy provided by the high voltage battery 16 may not be enough to sufficiently power the electric motor 26 to fully crank the engine 12. The controller 54 is therefor configured to effect actuation of the low voltage starter 22 to apply a second torque to the engine 12. The low voltage starter 22 is preferably a belt integrated starter-generator that includes a belt (not shown) that drives a shaft (not shown) of the engine 12.

In a preferred approach, the engine 12 is spun to an engine speed threshold prior to the actuation of the low voltage starter 22. In this way, the controller 54 may be adapted to monitor a speed of the engine 12, for example, via sensor 58a associated with the engine 12. The engine speed threshold may be, for example, at least 50 revolutions per minute. In this way, the controller 54 delays actuation of the low voltage starter 22 such that the low voltage starter 22 provides a torque to the engine 12 while the engine 12 is moving at a low speed, thereby diminishing the risk of belt slip.

In other approaches, the low voltage starter 22 is actuated simultaneously or substantially simultaneously with the actuation of the electric motor 26. In still other approaches, the low voltage starter 22 is energized simultaneously or substantially simultaneously with the actuation of the electric motor 26, and is only actuated upon the engine speed achieving the engine speed threshold.

The coordinated actuation of the electric motor 26 and the low voltage starter 22 described herein has been found to provide the engine 12 with the torque necessary to start the engine 12 in very cold temperatures.

Figure 3:
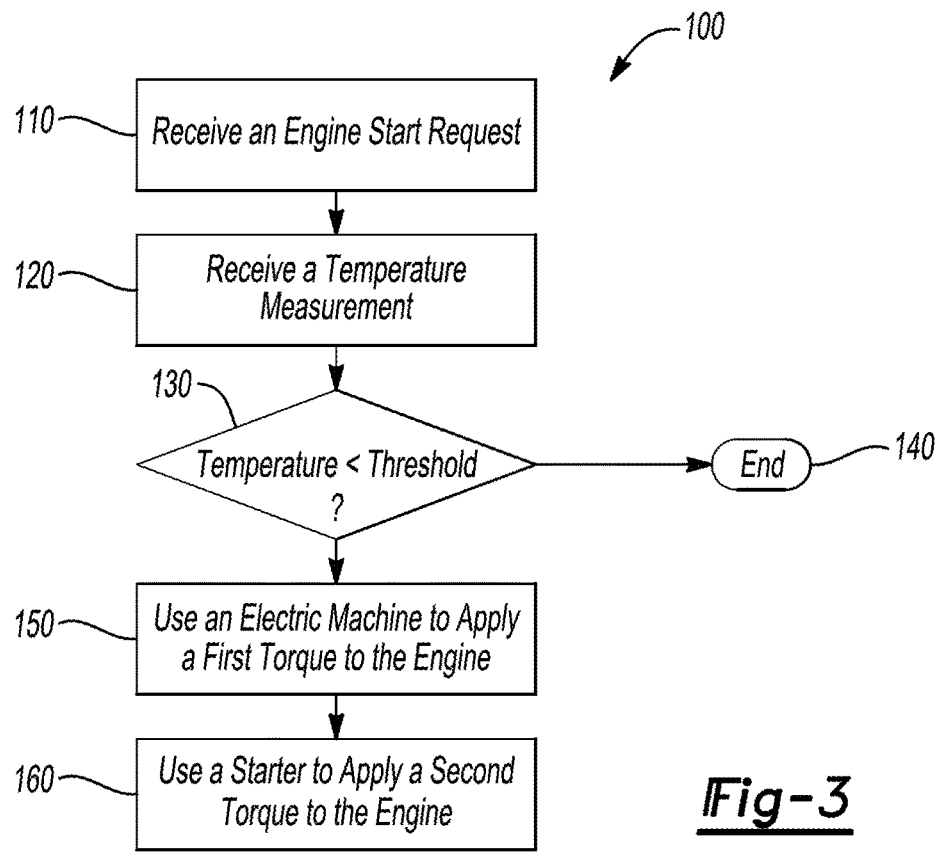
FIG. 3 is a flow chart of an algorithm for starting an engine of a vehicle.

Referring now to FIG. 3, a method 100 of starting an engine of a vehicle includes receiving 110, at a controller, a request to start the engine. The method further includes receiving 120, at a controller, a temperature measurement. The temperature measurement may be, for example, an ambient air temperature measurement.

If the temperature measurement is greater than a threshold temperature measurement at 130, the method may end 140. In this way, the engine may be started using any suitable method.

If the temperature measurement is less than a threshold temperature measurement at 130, the method includes using 150 an electric machine to apply a first torque to the engine. The threshold temperature measurement may fall, for example, within a range of −30 to +5 degrees Celsius.

In some approaches, the electric machine applies the first torque to the engine through a disconnect clutch. Locking the disconnect clutch couples rotating inertias of the electric machine with the engine to increase a speed of the engine. The disconnect clutch may be closed in response to a speed of the electric machine achieving a threshold electric machine speed. The threshold electric machine speed may be, for example, at least 300 revolutions per minute.

In response to an engine speed achieving an engine speed threshold, the method includes using 160 a starter to apply a second torque to the engine. The engine speed threshold may be, for example, at least 50 revolutions per minute. In a preferred approach, the starter is a belt integrated starter-generator (BISG). Other starters are expressly contemplated herein. In some approaches, the starter is operated in an energized mode prior to applying the second torque from the starter to the engine.

The engine start approaches described herein may be utilized in very cold temperature conditions during an initial engine startup, as well as during an engine restart (e.g., with an engine configured to auto-stop and auto-start).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine;
   an electric machine coupled to a transmission element, the electric machine selectively coupled with the engine by a disconnect clutch;
   a belt integrated starter-generator (BISG) operatively coupled to the engine; and
   an electronic controller comprising one or more inputs adapted to receive a temperature measurement and a request to start the engine, the electronic controller programmed to,
   energize the BISG and the electric machine in response to receiving an engine start request and the temperature measurement being less than a threshold temperature measurement; and
   close the disconnect clutch to apply torque from the electric machine to the engine in response to the electric machine achieving a threshold electric machine speed.

2. The vehicle of claim 1 wherein the threshold electric machine speed is at least 300 revolutions per minute.

3. The vehicle of claim 1 wherein the temperature measurement is an ambient air temperature measurement.

4. The vehicle of claim 1 wherein the threshold temperature measurement falls within a range of −30 to +5 degrees Celsius.

5. The vehicle of claim 1 wherein the electronic controller is adapted to actuate the BISG to apply torque to the engine in response to the engine achieving an engine speed threshold.

6. The vehicle of claim 5 wherein the engine speed threshold is at least 50 revolutions per minute.

7. A method of starting an engine of a vehicle comprising:
   by a controller,
   in response to receiving an engine start request and a temperature measurement being less than a threshold temperature measurement, energizing an electric machine,
   in response to the electric machine achieving a threshold electric machine speed, closing a disconnect clutch and energizing a belt-driven integrated starter generator (BISG) to apply torque to the engine.

8. The method of claim 7 wherein the energizing the BISG is further in response to an engine achieving an engine speed threshold.

9. The method of claim 8 wherein the engine speed threshold is at least 50 revolutions per minute.

10. The method of claim 7 wherein the threshold electric machine speed is at least 300 revolutions per minute.

11. The method of claim 7 wherein the temperature measurement is an ambient air temperature measurement.

12. The method of claim 7 wherein the threshold temperature measurement falls within a range of −30 to +5 degrees Celsius.

13. The method of claim 7 further comprising energizing the electric machine and actuating the BISG at a same time.

14. A method of starting an engine of a vehicle comprising:
   by a controller,
   in response to receiving an engine start request and a temperature measurement being less than a threshold temperature measurement, energizing an electric machine and a belt-driven integrated starter generator (BISG); and
   in response to the electric machine achieving a threshold electric machine speed, closing a disconnect clutch to apply a torque from the electric machine to the engine.

15. The method of claim 14 further comprising energizing the electric machine and BISG at a same time.

16. The method of claim 14 wherein the BISG is adapted to apply a second torque to the engine in response to an engine achieving an engine speed threshold.

17. The method of claim 16 wherein the engine speed threshold is at least 50 revolutions per minute.

18. The method of claim 14 wherein the threshold electric machine speed is at least 100 revolutions per minute.

19. The method of claim 18 wherein the threshold electric machine speed is at least 300 revolutions per minute.

20. The method of claim 14 wherein the temperature measurement is an ambient air temperature measurement, and wherein the threshold temperature measurement falls within a range of −30 to +5 degrees Celsius.

\* \* \* \* \*